United States Patent Office 3,318,958
Patented May 9, 1967

3,318,958
PROCESS FOR THE PRODUCTION OF
NITRO-HALOTHIOPHENYL ETHERS
Jany Renz, Jean-Pierre Bourquin, and Hans Winkler, Basel, and Pierre Gagnaux, Allschwil, Switzerland, assignors to Sandoz Ltd., Basel, Switzerland
No Drawing. Filed Mar. 30, 1964, Ser. No. 355,946
Claims priority, application Switzerland, Apr. 3, 1963, 4,239/63
7 Claims. (Cl. 260—609)

The present invention relates to a new process for the production of 3-nitro-4-halogeno-thiophenyl ethers of Formula I,

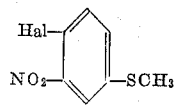

wherein Hal is a member selected from the group consisting of chlorine, bromine and iodine atoms.

It is known to produce compounds of general Formula I by nitration of the sulfonium compounds of thiophenol ethers of Formula II,

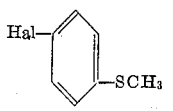

wherein Hal has the above significance. The resulting 3-nitro-4-halogeno-phenyl sulfonium compounds are, however, very difficult to isolate as a result of their high solubility and only one method for their separation has hitherto become known, namely, the isolation via the difficultly soluble perchlorate. This process, however, has a number of disadvantages, the most important of which is the ease with which the perchlorates decompose and their susceptibility to heating and mechanical action. For safety reasons (danger of explosion) the production of 3-nitro-4-halogeno-thiophenyl ethers is thus not possible on an industrial scale in accordance with this process. Furthermore, the relatively high price of the perchloric acid causes the cost of the final product to rise.

It has now surprisingly been found that perchloric acid can be replaced by aromatic sulfonic acids, e.g. by benzenesulfonic acid, para-toluenesulfonic acid, naphthalenedisulfonic acids, etc., or by their water-soluble salts. These acids and their salts are not susceptible to heat and mechanical action and are furthermore far cheaper than perchloric acid. As a result of the present invention thus, it has, for the first time, become possible to produce 3-nitro-4-halogeno-thiophenyl ether on an industrial scale.

The compounds of the general Formula I are important intermediates for the production of therapeutically valuable phenothiazine derivatives.

The process of the invention may, for example, be effected as follows: A thiophenyl ether of general Formula II is converted in suitable manner with dimethyl sulfate to form the corresponding sulfonium compound. The resulting sulfonium compound is dissolved at 0° C. to 10° C. in concentrated sulfuric acid and concentrated nitric acid is added while cooling. For the purpose of completing the reaction the mixture can advantageously be heated slightly for one hour. The reaction product is then diluted with ice water and the sulfonium compound isolated from the aqueous solution as the sulfonium sulfonate by the addition of an aromatic sulfonic acid or one of its water-soluble salts, e.g. the sodium salt of para-toluenesulfonic acid. The resulting salt can easily be decomposed by heating in an aqueous sodium chloride solution and the desired 3-nitro-4-halogeno-thiophenyl ether obtained therefrom in a good, technically pure yield.

The sodium salt of the aromatic sulfonic acid remains in the mother liquor of the aqueous sodium chloride solution and can be re-used for the next precipitation.

In the following non-limitative examples all temperatures are stated in degrees centigrade.

Example 1.—3-nitro-4-chloro-thioanisole 260 grams of dimethylsulfate are added while stirring to 317 grams of para-chloro-thioanisole (boiling point 110°–112°/14 mm.) which has been heated to 80°, in such a manner that the inner temperature is 140° after the addition. The reaction mixture, which has been cooled to 10°, is then subsequently dissolved in one liter of concentrated sulfuric acid and 220 grams of 98% nitric acid are then slowly added in such a manner that the temperature never rises above 50°. After heating for one hour to 50°, the reaction mixture is poured onto 3 kilograms of ice and 470 grams of the sodium salt of para-toluene-sulfonic acid are added portionwise while stirring, the mixture is stirred for a further half hour and then diluted with 1.8 liters of water and 500 grams of ice. After one hour the separated dimethyl-(3-nitro-4-chloro-phenyl)-sulfonium-para-toluene sulfonate is filtered off with suction. The still damp salt is boiled at reflux for six hours in 2 liters of a 20% sodium chloride solution. After cooling to 60° the precipitated 3-nitro-4-chloro-thioanisole is filtered off with suction, rewashed well with water, and dried in a vacuum. The thus resulting 3-nitro-4-chloro-thioanisole melts at 72°–74° (analytically pure compound 73°–75°).

The mother liquor contains the sodium salt of para-toluene-sulfonic acid and can be re-used for the next precipitation though the losses must in each case be compensated for.

Example 2.—3-nitro-4-bromo-thioanisole 406 grams of para-bromo-thioanisole (melting point 37.4°) are heated to 80° and, while stirring, 260 grams of dimethylsulfate are added in such a manner that the inner temperature at the end of the addition is 140°–150°. After cooling to approximately 20° the reaction mixture is dissolved in one liter of concentrated sulfuric acid and 220 grams of 98% nitric acid are added dropwise during the course of one hour in such a manner that the temperature does not rise above 50°. Subsequently the mixture is stirred for a further hour at 50° and then, after cooling, the reaction mixture is poured onto 3 kilograms of ice. 470 grams of sodium salt of para-toluene-sulfonic acid are then added portionwise to the solution while stirring, the mixture is stirred for a further half hour and then diluted with 1.8 liters of water and 500 grams of ice. After one hour the precipitated dimethyl-(3-nitro-4-bromo-phenyl)-sulfonium-para-toluene sulfonate is filtered off with suction. The still moist salt is boiled at reflux with 2 liters of a 20% sodium chloride solution for 6 hours. After cooling to 70° the precipitated 3-nitro-4-bromo-thioanisole is filtered off with suction, rewashed well with water and dried in a vacuum. The resulting 3-nitro-4-bromo-thioanisole still contains some inorganic compounds and melts at 77°–80° (analytically pure compound 76°–78°). The mother liquor contains the sodium salt of para-toluenesulfonic acid and can be re-used for the precipitation.

What we claim is:
1. A process for the production of a compound of Formula I

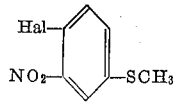

in which Hal is a member selected from the group consisting of chlorine, bromine and iodine atoms, by nitration of the dimethyl sulfate sulfonium compound of a thiophenyl ether of Formula II

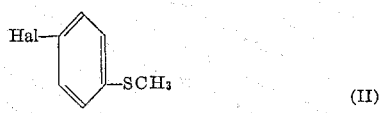

(II)

in which Hal has the above significance, which comprises recovering the compound I from the reaction mixture by converting the dimethyl sulfate sulfonium compound of a thiophenyl ether of Formula I to the corresponding sulfonium sulfonate with a member selected from the group consisting of an aromatic sulfonic acid and a water-soluble salt thereof and hydrolyzing said sulfonium sulfonate to form the compound I.

2. A process as claimed in claim 1 in which the hydrolysis is carried out with sodium chloride and the resulting product thereafter separated by filtration.

3. A process as claimed in claim 1 in which the hydrolysis is carried out at the temperature of reflux.

4. A process for the production of a compound of Formula I

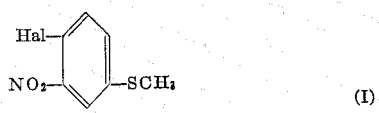

(I)

in which Hal is a member selected from the group consisting of chlorine, bromine and iodine atoms, by nitration of the dimethyl sulfate sulfonium compound of a thiophenyl ether of Formula II

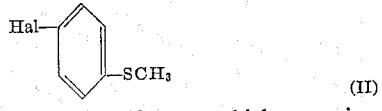

(II)

in which Hal has the above significance, which comprises recovering the compound I from the reaction mixture by converting the dimethyl sulfate sulfonium compound of a thiophenyl ether of Formula I to the corresponding sulfonium sulfonate with the sodium salt of para-toluenesulfonic acid and hydrolyzing said sulfonium sulfonate to form the compound I.

5. A process according to claim 1 in which the conversion to the sulfonium sulfonate is carried out at about 0° C.

6. A process according to claim 1 in which the sulfonium sulfonate is precipitated and separated prior to hydrolysis.

7. A process for the production of a compound of Formula I

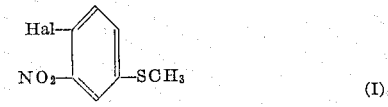

(I)

in which Hal is a member selected from the group consisting of chlorine, bromine and iodine atoms, by nitration of the dimethyl sulfate sulfonium compound of a thiophenyl ether of Formula II

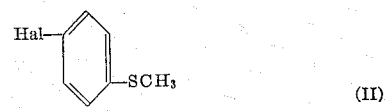

(II)

in which Hal has the above significance, which comprises recovering the compound I from the reaction mixture by converting the dimethyl sulfate sulfonium compound of a thiophenyl ether of Formula I to the corresponding sulfonium sulfonate at about 0° C. with the sodium salt of para-toluenesulfonic acid, precipitating and separating the resulting sulfonium sulfonate, hydrolyzing said sulfonium sulfonate with sodium chloride at the temperature of reflux to form the compound I and separating off said compound I.

No references cited.

CHARLES B. PARKER, *Primary Examiner.*

DELBERT R. PHILLIPS, *Assistant Examiner.*